(12) United States Patent
Mehendale et al.

(10) Patent No.: US 7,340,965 B2
(45) Date of Patent: Mar. 11, 2008

(54) MASS FLOWMETER OF THE CORIOLIS TYPE

(75) Inventors: Aditya Mehendale, Ruurlo (NL); Joost Conrad Lötters, Gaanderen (NL); Jan Marinus Zwikker, Hengelo (NL)

(73) Assignee: Berkin B.V., Ruurlo (NL)

( * ) Notice: Subject to any disclaimer, the term of this patent is extended or adjusted under 35 U.S.C. 154(b) by 0 days.

(21) Appl. No.: 11/412,174

(22) Filed: Apr. 27, 2006

(65) Prior Publication Data

US 2006/0243067 A1  Nov. 2, 2006

(30) Foreign Application Priority Data

May 2, 2005  (NL) .................................. 1028938

(51) Int. Cl.
*G01F 1/84*  (2006.01)
(52) U.S. Cl. ................................. 73/861.355
(58) Field of Classification Search ............................... 73/861.355–861.357
See application file for complete search history.

(56) References Cited

U.S. PATENT DOCUMENTS

| | | | |
|---|---|---|---|
| 3,108,475 A * | 10/1963 | Henderson | 73/861.355 |
| 4,658,657 A | 4/1987 | Kuppers | |
| 4,716,771 A * | 1/1988 | Kane | 73/861.355 |
| 4,811,606 A * | 3/1989 | Hasegawa et al. | 73/861.357 |
| 5,073,208 A | 12/1991 | Wong et al. | |
| 5,078,014 A * | 1/1992 | Lew | 73/861.355 |
| 5,355,737 A | 10/1994 | Lew et al. | |
| 5,501,106 A * | 3/1996 | Lew et al. | 73/861.356 |
| 5,540,106 A | 7/1996 | Lew et al. | |
| 5,551,307 A * | 9/1996 | Kane et al. | 73/861.356 |
| 5,926,096 A * | 7/1999 | Mattar et al. | 73/861.356 |
| 6,588,284 B1 * | 7/2003 | Shiraishi et al. | 73/861.355 |
| 2001/0029790 A1 | 10/2001 | Ollila Curtis John et al. | |

FOREIGN PATENT DOCUMENTS

| | | |
|---|---|---|
| EP | 0 250 706 | 1/1988 |
| EP | 0 361 388 | 4/1990 |

* cited by examiner

*Primary Examiner*—Harshad Patel
(74) *Attorney, Agent, or Firm*—Young & Thompson

(57) ABSTRACT

A mass flowmeter of the Coriolis type with a tube that forms a mechanically closed loop through which a medium flows during operation, and with preferably electromagnetic, contactless excitation elements for causing the loop to rotate in an oscillatory mode about an axis of rotation during operation. The loop has a starting point and an end point. The starting and end points are situated close together and are connected to a flexible inlet tube and a flexible outlet tube, respectively, which extend preferably in parallel and close together. The loop is resiliently suspended from the frame of the flowmeter via the flexible inlet and outlet tubes, which preferably form one integral piece with the tube of the loop.

19 Claims, 6 Drawing Sheets

MASS FLOWMETER OF THE CORIOLIS TYPE

BACKGROUND OF THE INVENTION

1. Field of the Invention

The invention relates to a mass flowmeter of the Coriolis type, with a sensing tube that forms a single loop through which a medium flows during operation, and with excitation means for causing said loop to oscillate about an excitation axis of rotation during operation, said axis lying in the plane of said loop.

2. Description of the Related Art

Such a mass flowmeter is known from U.S. Pat. No. 4,658,657.

The known mass flowmeter comprises a looped tube that is not closed (half a turn) and that forms a transverse branch at one side which is connected to two lateral branches clamped in at the opposite side in a mounting beam. The latter is mounted in a support such that it can rotate about a central axis lying in the plane of the loop. An electromagnetic excitation system cooperating with the (magnetic) mounting beam provides an oscillatory rotation (vibration) of the mounting beam with the loop about the central axis. When a medium flows through the loop that rotates about the central axis, Coriolis forces are generated in the transverse branch that is oriented perpendicularly to the axis of rotation, resulting in a vibration of the loop about an axis perpendicular to the excitation axis of rotation. This vibration, which is proportional to the flow, is superimposed on the fundamental oscillation and leads to a phase shift between the oscillations performed by the ends of the transverse branch. The phase difference is proportional to the Coriolis force and accordingly to the flow.

It is a disadvantage of the known system, however, that the mounting beam used for the excitation of the loop constitutes an additional mass. This prevents a change in the excitation frequency as a function of the density of the medium flowing through the tube, with the result that a measurement of the density (an additional property of a Coriolis flowmeter) becomes less accurate.

SUMMARY OF THE INVENTION

The invention has for its object inter alia to provide a sensitive flowmeter with an excitation system that is capable of measuring a.o. the medium density more accurately.

The mass flowmeter of the kind mentioned in the opening paragraph is for this purpose characterized in that the loop follows a substantially circumferential, mechanically closed path, in that the sensing tube has two mutually opposed ends that are connected to a flexible inlet tube and to a flexible outlet tube for the flowing medium, and in that the loop is resiliently suspended from a frame by means of said flexible inlet and outlet tubes such that the resulting suspension allows a movement about two mutually perpendicular axes in the plane of the loop, one for the excitation movement and one for the Coriolis movement that arises when a medium is flowing through the tube.

The expression 'mechanically closed path' relating to the loop denotes that the loop has an interruption, on either side of which the tube has mutually opposed first and second ends. These ends are mechanically connected to one another in some manner, for example with solder. A force can thus be propagated through the loop.

It is ensured in this manner that the loop has a certain rigidity. This is necessary in order to prevent local vibrations of tube portions from occurring at the same (low) frequencies as the excitation movement and the Coriolis movement. The mechanical interconnection of the loop ends causes the loop to become stiffer (manifesting itself in higher natural frequencies) than the suspension of the loop. Expressed in these terms, therefore, the invention provides a stiff loop with a slack suspension.

According to the invention, the mechanically closed, loop-shaped tube is resiliently suspended from the inlet and the outlet tube, which together act as a flexible connecting element. That is to say: the inlet and outlet tubes are flexible and capable of torsion to a greater or lesser degree and thus act as spring elements. This suspension allows a movement about two mutually perpendicular axes that lie in the plane of the loop, one for the excitation movement and one for the Coriolis movement.

A mass flowmeter with a loop-shaped tube suspended in this manner has an enhanced sensitivity because the inlet and outlet tubes have been given freely resilient longitudinal dimensions that are as great as possible, and the suspension stiffness of the loop is a minimum for a given tube diameter, especially if said tubes extend parallel next to one another, preferably against one another. An additional advantage of a fastening of the inlet and outlet tubes next to one another to the frame is that the temperature sensitivity of the flowmeter is less than in the case in which the fastening points are far removed from one another.

As will be explained in more detail further below, various versions of the inlet and outlet tubes are possible, each with its own advantages. A practical embodiment that is preferable on mechanical grounds is, for example, one in which the loop is formed as one integral piece with the inlet tube and the outlet tube.

Irrespective of the further design, it is important that the inlet and outlet tubes should be fastened to the frame, directly or with the aid of fastening means, at a predetermined distance from the location where they are connected to the sensing tube, which predetermined distance defines their free path length. The free path length is one of the determining factors for the spring characteristic.

The inlet and outlet tubes may lie in the plane of the loop or outside the plane of the loop. The more they lie in the plane of the loop, however, the better. If they lie in the plane of the loop, they may lie entirely or partly within the loop. Alternatively, they may lie entirely outside the loop, for example in line in a plane transverse to the loop, in line in the plane of the loop, parallel in a plane that is at an angle to the plane of the loop, or parallel in the plane of the loop but outside the loop itself.

A preferred embodiment is characterized in that the inlet and outlet tubes extend mutually parallel over their free path lengths, close together or against one another, because their torsional stiffness is lower then, and preferably have a maximum free path length up to the fastening means, because this reduces their bending stiffness. A maximum free path length can be realized in that the inlet and outlet tubes are fastened to the frame by fastening means outside the loop.

As will be explained in more detail further below, the looped sensing tube can be connected in the so-termed twist or rotation mode or in the swing mode. The twist mode is preferred within the scope of the invention, in particular if it takes place about an axis of rotation lying in the plane of symmetry of the loop.

An embodiment that is advantageous on account of its sensitivity is characterized in that the loop forms a rectangle with two parallel lateral tubes, a first transverse tube connected to first ends of the lateral tubes, and two second transverse tubes connected at their one ends to the second ends of the lateral tubes and at their other ends to the inlet tube and the outlet tube, respectively.

A very compact embodiment of the above design is characterized in that the inlet and the outlet tube extend in the plane of the loop and within the loop, closely next to one another or against one another, on either side of an axis of symmetry of the loop, and are fastened to the frame in a location closer to the first transverse tube than to the second transverse tube. More in particular, the free path length of the inlet tube and the outlet tube amounts to at least 50% of the height of the loop as viewed in a direction parallel to the inlet and outlet tubes. This means for a looped tube having a rectangular shape that the free path length of the inlet and the outlet tube is at least 50% of the length of each of the lateral tubes.

The loop must follow a mechanically closed path. A first embodiment is for this purpose characterized in that the second transverse tubes are mechanically interconnected adjacent their connections to the inlet and the outlet tube. A second embodiment, which may be combined with the first one if so desired, is characterized in that the inlet and the outlet tube extend mutually parallel and closely together, or against one another, over their free path lengths and are mechanically interconnected over at least part of their free path lengths. The use of solder is particularly suitable for achieving the connections mentioned above.

The excitation (i.e. causing to vibrate) of the looped tube of the mass flowmeter according to the invention may be effected in various ways, for example by means of a magnetic disc adhered to the tube and an electromagnet with an air-coil. The present loop, however, is an intrinsically very light object, and if excitation means are fastened thereto it will cost an additional amount of energy to bring the loop into resonance. It is accordingly preferred to use an excitation technique that does not require the addition of further components to the loop.

In this respect, an embodiment is characterized in that the excitation means comprise means adapted to generate an electric (alternating) current in the wall of the tube, preferably through induction, and magnet means that generate a magnetic field transverse to the direction of the current in the tube wall so as to exert, through interaction with the current through the tube, electromagnetic forces (so-termed Lorentz forces) on the tube with the object of causing the tube to rotate about one of the perpendicular axes. Lorentz forces are forces that are generated when an electric current passes through a magnetic field.

In this connection, a first embodiment is characterized in that the magnet means comprise a permanently magnetic magnet yoke with an air gap through which a tube portion extends. The swing excitation mode mentioned above can be generated thereby.

An embodiment for realizing a so-termed torque excitation is characterized in that the magnet means comprise a permanently magnetic magnet yoke with two air gaps through which respective tube portions extend, oppositely directed magnetic fields being produced in said air gaps. Torque excitation may be used for realizing a twist excitation mode as well as a swing excitation mode.

For measuring the effect of the Coriolis forces, two sensors adapted for measuring displacements of two points of a tube portion as a function of time are preferably arranged adjacent this tube portion on either side of the excitation rotation axis. If there is little space, for example in the case of a tube of triangular shape, it is advantageous if the magnet yoke has a central opening between the air gaps, and the sensors are arranged in said opening.

Given a tube that forms a rectangular loop, there is space for positioning the sensors and the yoke as favorably as possible around the circumference. In an embodiment, the magnet yoke for a tube forming a rectangular loop is arranged at one side of the rectangular loop, with the sensors at the side opposite thereto.

BRIEF DESCRIPTION OF THE DRAWING FIGURES

The invention will now be explained in more detail with reference to a drawing showing a number of embodiments of the invention.

Figure 3:
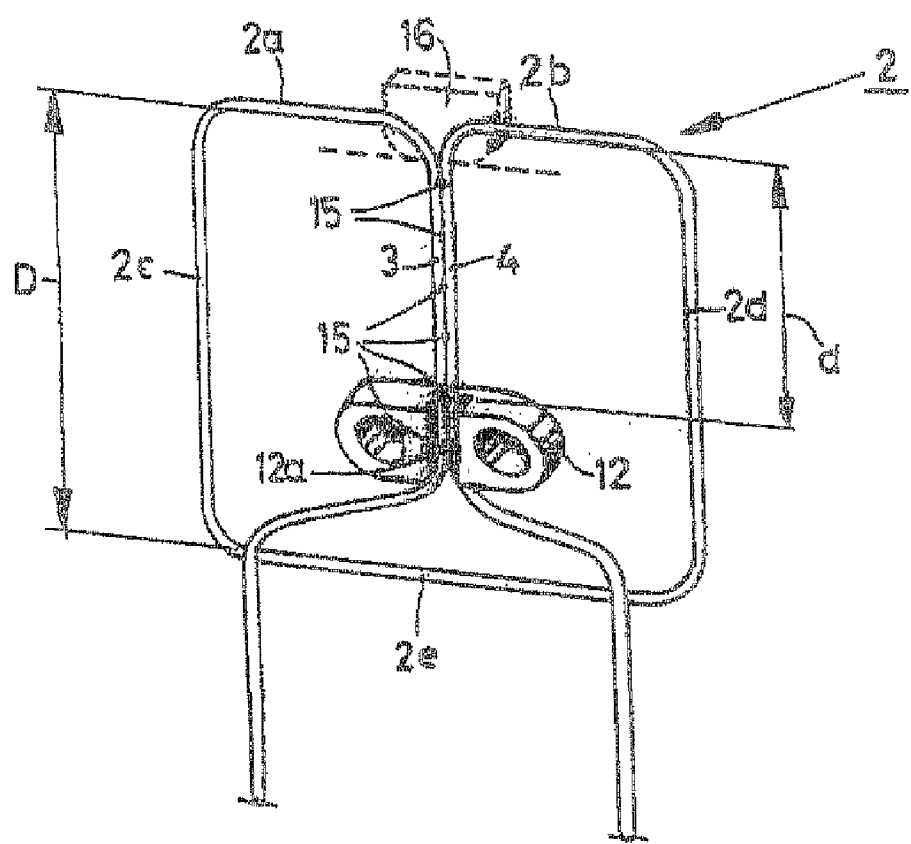
FIG. 3 is a perspective view of the looped tube used in the flowmeter of FIGS. 1 and 2.
Figure 4A:
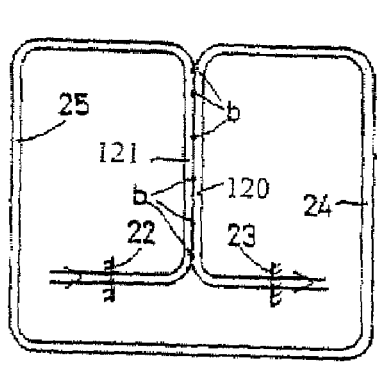
Figure 7:
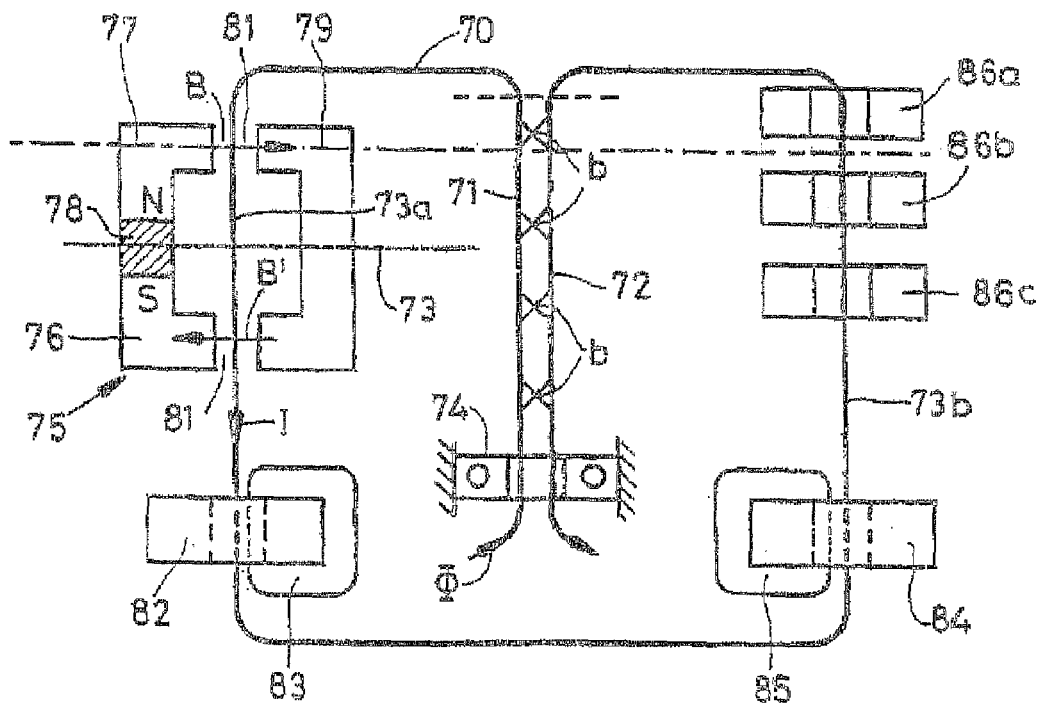
Figure 8:
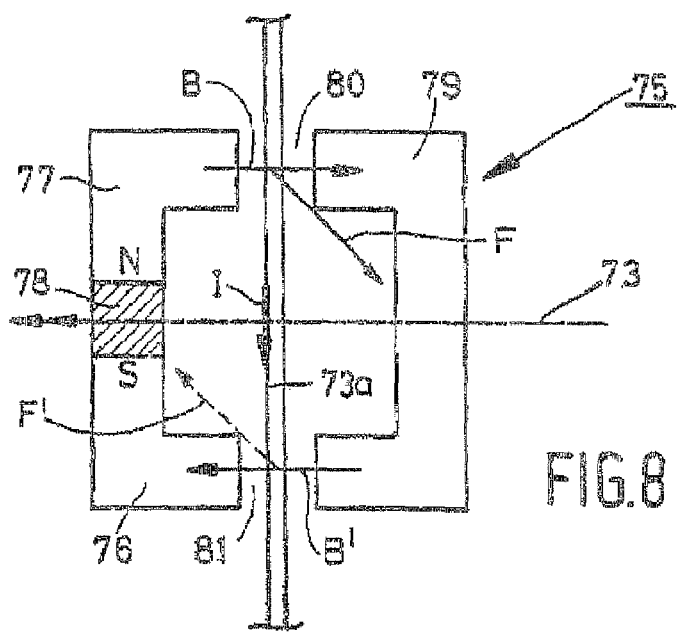

FIGS. 4A and B are front elevations and FIGS. 4C to F are perspective views of alternative embodiments of the suspension of the looped tube of FIG. 3;

FIGS. 5 and 6 are front elevations of alternative embodiments of the looped tube of FIG. 3;

FIG. 7 diagrammatically shows an alternative embodiment of a Coriolis flowmeter according to the invention; and FIG. 8 is a front elevation of a permanently magnetic magnet yoke as used in the flowmeter of FIG. 7.

DETAILED DESCRIPTION OF THE PREFERRED EMBODIMENTS

Figure 1:
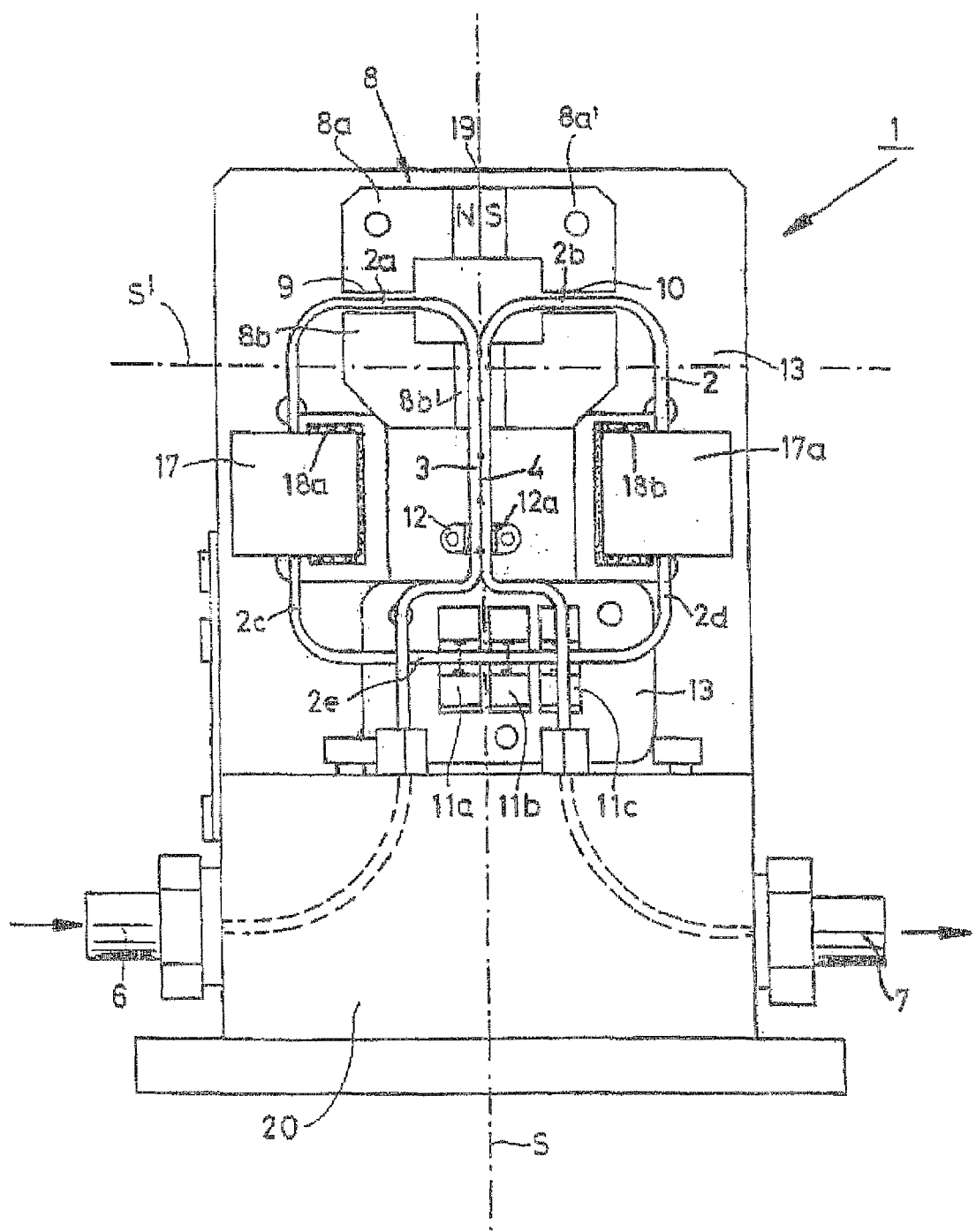
FIG. 1 is a front elevation of a Coriolis flowmeter according to the invention.

FIG. 1 shows a flowmeter 1 of the Coriolis type with a looped sensing tube 2 bent into a rectangular shape so as to follow a substantially circumferential path (substantially one full turn). The looped sensing tube 2 comprises two parallel lateral tube portions 2c, 2d which are connected at one end to a first transverse tube portion 2e and at the other end to two second transverse tube portions 2a, 2b. The latter are connected, at that side where they are connected to the lateral tubes 2c, 2d, to a flexible inlet tube 3 and a flexible outlet tube 4 for a fluid medium. Preferably, the loop 2 and the inlet and outlet tubes 3, 4 are portions of one and the same tube. The tube 2 in its entirety is bent into a rectangular shape with rounded corners to enable the tube to be bent into this shape. The inlet tube 3 is connected to a supply line 6 and the outlet tube 4 to a discharge line 7 via a supply/discharge block 20. The inlet and outlet tubes 3, 4 of this embodiment extend within the loop 2 and are fastened to a frame 13 by fastening means 12. The fastening is provided in a location such that the free path length of the inlet and the outlet tube 3, 4 (i.e. the portion of the inlet/outlet tube 3, 4 between the connection of the second transverse tube portions 2a, 2b and the location of the fastening to the fastening means 12) is at least 50%, preferably at least 60% of the length of each of the lateral tube portions 2c, 2d. The flexible inlet and outlet tubes 3, 4 do not form part of the loop of the sensing tube 2 but provide a flexible fastening of the loop 2 to the frame 13. The loop 2 may thus be regarded as being flexibly suspended from the frame by means of the inlet and outlet tubes. The loop 2 and the inlet and outlet tubes 3, 4 may advantageously be manufactured from one integral piece of tubing. This may be, for example, a stainless steel tube with an outer diameter of approximately 0.7 mm and a wall thickness of approximately 0.1 mm. Depending on the outer dimensions of the loop 2 and the pressure the tube is to be able to withstand (for example 100 bar), the outer diameter of the tube will usually be smaller than 1 mm and the wall thickness 0.2 mm or less.

The looped tube 2 is shown in more detail in FIG. 3, where components known from FIG. 1 have been given the same reference numerals. The tube 2 consists of a substantially rectangular framework comprising two parallel lateral tubes 2c and 2d, a first transverse tube 2e connected to first (lower) ends of the lateral tubes 2c and 2d, and two second transverse tubes 2a and 2b connected at one side to second (upper) ends of the lateral tubes 2c and 2d and at the other side to the centrally extending inlet and outlet tubes 3 and 4, respectively. The place of the transitions from the inlet and outlet tubes 3, 4 to the tube 2 is symbolically indicated with a broken line. The rectangular framework of the tube 2 has rounded corners. The tubes 3 and 4, which run closely together on either side of and symmetrically with respect to the main axis of symmetry S (cf. FIG. 1), are fastened to the fastening means 12, for example by clamping or soldering or welding, said means 12 in their turn being fastened to the frame 13. An alternative is to fasten the tubes 3, 4 directly to the frame 13. FIG. 3 shows by way of example a cavity 12a in fastening means (block) 12, in which the tubes 3, 4 are retained. The inlet and outlet tubes 3, 4 are flexible and act as it were as a suspension spring for the sensing tube 2. This suspension allows a motion of the loop 2 both about the main axis of symmetry S and about a second axis S' situated in the plane of the loop 2 and perpendicular to the main axis of symmetry S (cf. FIG. 1).

To close the loop mechanically (i.e. to interconnect the beginning and end of the loop mechanically, directly or indirectly), the tubes 3, 4 are preferably connected to one another along the extent of their free path lengths, for example in that they are welded or soldered together. FIG. 3 shows a few connection spots with reference numeral 15 by way of example.

An alternative is that the transverse tubes 2a and 2b are connected to one another and possibly to the inlet and outlet tubes 3 and 4, for example by fastening to a support element 16 in a location where they come close together. A connection between the second transverse tubes 2a, 2b and/or between the inlet and outlet tubes 3, 4 is important for creating a mechanically closed loop so as to obtain the correct vibration modes in operation.

To obtain a good spring action, the tubes 3, 4 preferably have as great as possible a free path length d. More in particular, d is preferably greater than 0.5 times the length D of the lateral tubes 2c and 2d. The fastening means 12 are accordingly positioned closer to the first transverse tube 2e than to the second transverse tubes 2a, 2b.

The inlet tube 3 and the outlet tube 4 are bent out of the plane of the loop 2 beyond the fastening means 12 in the embodiment of FIG. 3, i.e. they curve around the first transverse tube 2e so as to be connected to supply and discharge lines. They preferably move away from one another to facilitate this connection. This is more clearly seen in FIG. 2. Preferably, the free path lengths of the inlet and the outlet tube lie in one plane with the tube portions of the loop.

FIG. 4 shows a number of alternatives for arranging and fixing the inlet and outlet tubes on the basis of a number of rectangular loops, which alternatives all utilize the suspension principle presented with reference to FIG. 3. An additional slackness is added to the suspension spring construction in the alternatives of FIG. 4 in that the fastening points of the inlet and the outlet tube are located farther away than in FIG. 3.

FIG. 4A shows a substantially rectangular looped tube 21 with inlet and outlet tubes 120, 121 that extend within and in the plane of the loop, said tubes moving away laterally from a given point in different directions. The tubes 120, 121 are retained in fixation points 22, 23 that lie within the loop. The fact that the fixation points are laid farther away than in the situation of FIG. 3 provides the resilient suspension with an additional slackness. The tubes 120, 121 may continue beyond the fixation points 22, 23, passing with slight curves over the lateral tubes 24, 25 of the looped tube 21, or they may be perpendicularly curved backwards.

Figure 4B:
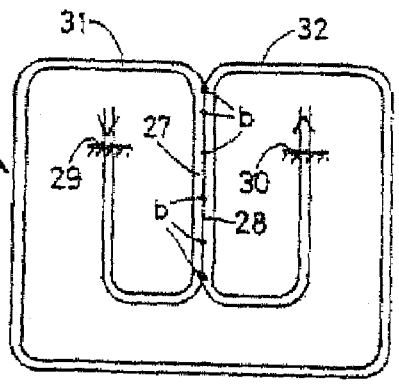

FIG. 4B shows a substantially rectangular looped tube 26 with parallel inlet and outlet tubes 27, 28 extending in the plane of the looped tube and continuing from a given point with an extra bend to their respective fastening points. The tubes 27, 28 are fastened at locations 29 and 30. The fastening points are located even farther away fom the locations where the input and the output tube are connected to the loop parts 31,32 in this manner than in FIG. 4A.

It may be desired to increase the free path lengths of the inlet and outlet tubes to beyond the lowermost transverse tube (cf. FIG. 2) by bending them out of the plane of the loop (over the lowermost transverse tube), but this would be to the detriment of the spring characteristic. This problem is solved by the construction of FIG. 4C.

Figure 4C:
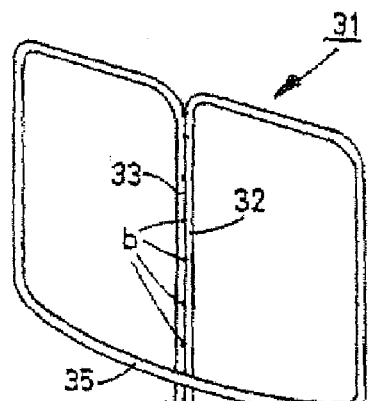

FIG. 4C shows a substantially rectangular looped tube 31 with inlet and outlet tubes 32, 33 extending in one plane closely next to one another. The tubes 32, 33 are fixed by fastening means 34 situated outside the loop 31. The tubes 32, 33 have no kinks because the lower transverse tube 35 of the loop 31 has been curved outwards.

Figure 4D:
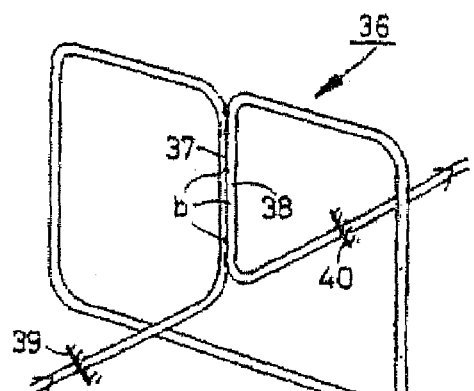

FIG. 4D shows a substantially rectangular looped tube 36 with inlet and outlet tubes 37, 38 extending first in the plane of the loop 36 and then separating so as to move away from the plane of the loop 36 in mutually opposed directions. The tubes 37, 38 are fixed at a given distance from the plane of the loop 36 in locations 39 and 40 in order to increase the free path length.

Figure 4E:
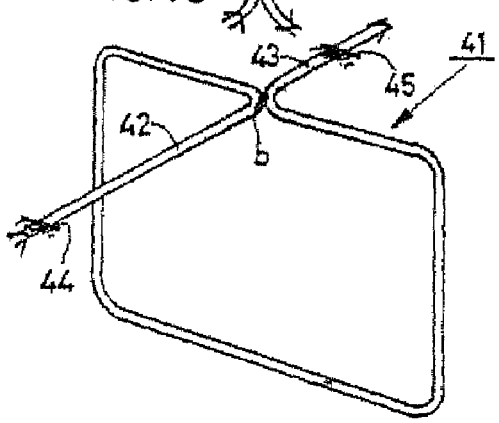

FIG. 4E presents an alternative to the construction of FIG. 4D and shows a substantially rectangular looped tube 41 with inlet and outlet tubes 27, 28 not extending initially in the plane of the loop, as was the case in FIG. 4D, but splitting up and moving away immediately from the plane of the loop 41 in mutually opposed directions. The tubes 42, 43 are fixed in locations 44 and 45 outside the plane of the loop 41.

Figure 4F:
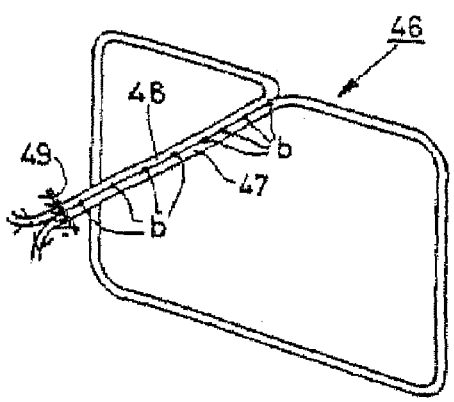

FIG. 4F shows a substantially rectangular looped tube 46 with inlet and outlet tubes 47, 48 that move away immediately from the plane of the loop 46 in the same direction. The inlet and outlet tubes 47, 48, which are preferably parallel, are fixed in a location 49 outside the plane of the loop 46. This construction forms a compact alternative to the construction of FIG. 4E.

It is advantageous in those embodiments in which the fixation points of the inlet and outlet tubes lie outside the plane of the loop (FIGS. 4D, 4E, 4F) if they are arranged symmetrically with respect to the plane of the loop (FIGS. 4D, 4E).

In all FIGS. 4A to 4F, the reference symbol b denotes solder spots.

The embodiments described above relate to the use of rectangular loops. It is alternatively possible, however, to use shapes other than the rectangular one, as long as the loop forms a (mechanically) closed turn. Some of these alternatives, all resiliently suspended by means of inlet and outlet tubes situated within the loop, are shown in FIG. 5.

Figure 5A:
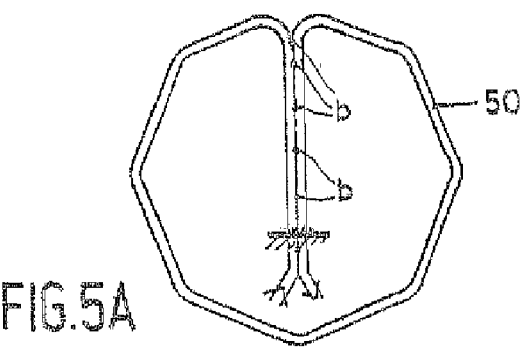

FIG. 5A is a front elevation of a polygonal loop 50 (octagonal in this case, but six sides or more than eight sides are also possible).

Figure 5B:
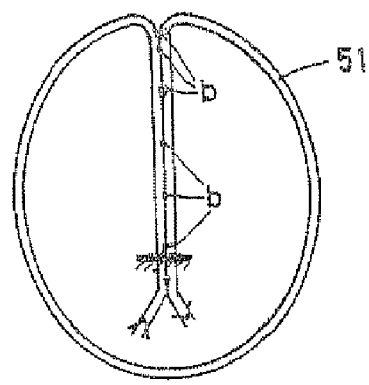

FIG. 5B shows an elliptical loop 51.

Figure 5C:
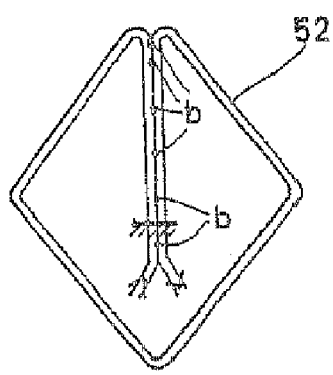

FIG. 5C shows a diamond-shaped loop 52.

Figure 5D:
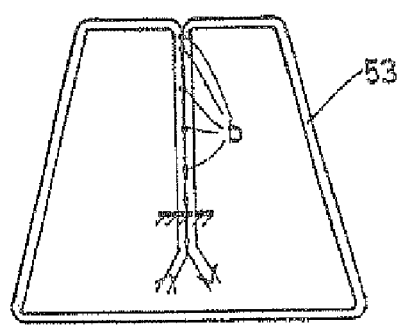

FIG. 5D shows a trapeziform loop 53.

The loop shapes shown in FIG. 5 have the resilient portions of their inlet and outlet tubes entirely within the loop. However, they may alternatively lie partly outside the loop, as in FIGS. 4C and 4D, or entirely outside the loop, as in FIGS. 4E and 4F. The sensitivities of the mass flowmeters having the loop shapes shown in FIG. 5 differ only slightly. The rectangular shape of FIG. 3, however, provides the greatest sensitivity for given external dimensions.

Figure 6A:
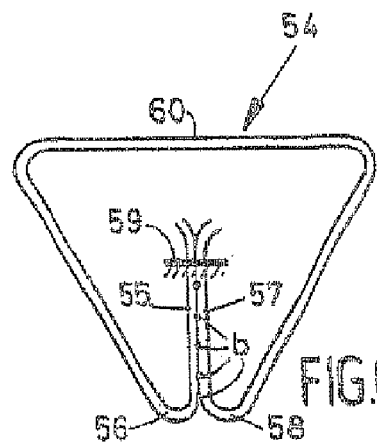
Figure 6B:
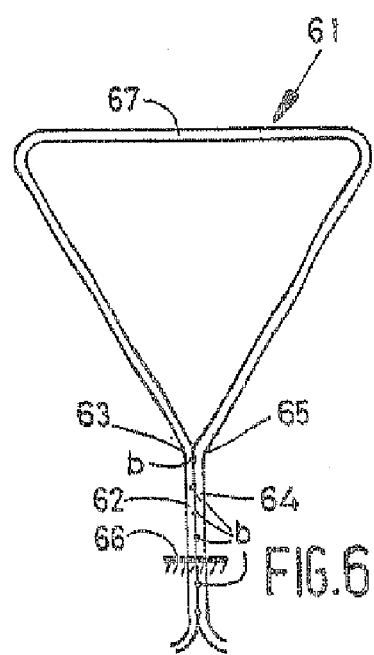

FIGS. 6A and 6B show looped tubes 54 and 61 according to the invention arranged into triangular shapes that may be regarded as modifications of the rectangular tube of FIG. 3. The looped tube 54 (FIG. 6A) has an inlet tube 55 that is connected to the loop 54 adjacent a starting point 56 of the loop 54. The incoming flow traverses a first oblique side of the triangular shape from this starting point 56, then the base 60, and finally a second oblique side of the triangular shape. At the end point 58, the triangular tube 54 is connected to an outlet tube 57. The inlet and outlet tubes 55, 57 extend in parallel, close together in the plane of the loop 54 and within the loop 54 and are fastened to a frame (not shown) by fastening means 59. A resilient suspension of the loop 54 is thus realized comparable to that of the loop 2 in FIG. 3. The tube 54 may be provided with projections or "ears" at the transitions between the base 60 and each of the oblique sides.

The same holds mutatis mutandis for the looped tube 61 shown in FIG. 6B, which is also bent into a triangular shape. Here the inlet and outlet tubes 62, 64 extend in parallel, close together in the plane of the loop 61 but outside the loop 61, so that the free path length of the spring formed by the inlet and outlet tubes 62, 64 can be greater than in the construction of FIG. 6A. The inlet and outlet tubes 62, 64 are connected via fastening means 66 to a frame (not shown) at one side and to the starting point 63 and end point 65 of the triangular tube 61 at the other side.

To obtain a mechanical closure of the looped tubes 54 and 61 shown in FIGS. 6A and 6B, the respective inlet and outlet tubes 55, 57 and 62, 64 are mechanically interconnected over at least part of their free path lengths, for example by means of welding or soldering. The mechanical interconnection suppresses the occurrence of natural frequencies that could interfere with the measurement. An alternative is to make a mechanical connection between the starting point 56, 63 and the end point 58, 65 of the respective loop 54, 61.

The closed triangular tubes according to the invention may alternatively be constructed with a double loop instead of a single loop. Depending on the design, it is possible to use the same directions of flow as well as mutually opposed directions of flow in the two loop portions.

The excitation (into oscillation) of the looped tube of the mass flowmeter according to the invention may take place in various manners, for example by means of a magnetic disc adhered to the tube and an electromagnet with air-coil positioned separately from the tube. The present sensing tube, however, is of itself a very light object, and if excitation means are fastened thereto, it will require an additional amount of energy to bring the loop into resonance. Therefore, FIGS. 1 and 2 show special excitation means that render it unnecessary to add further components to the loop.

Figure 2:
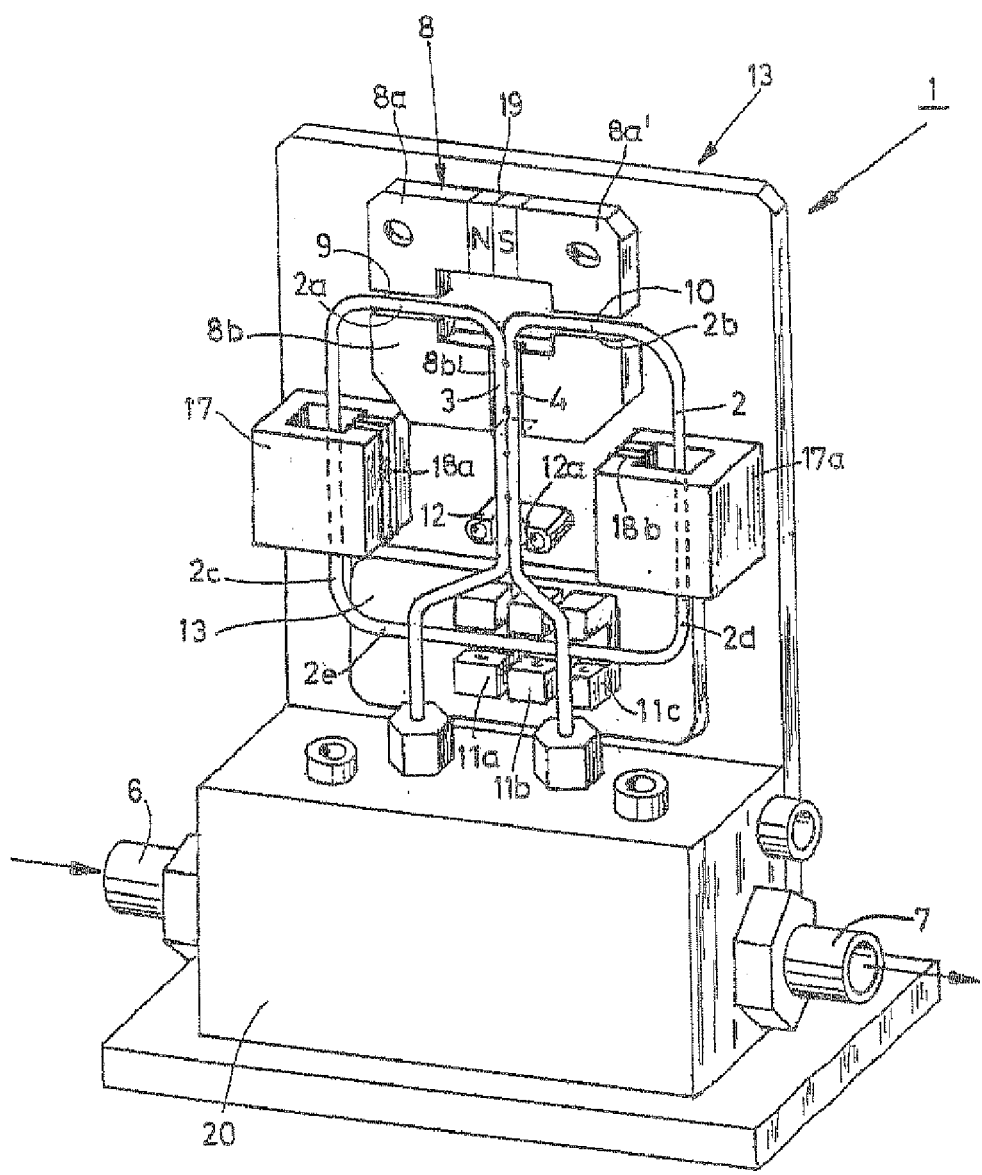
FIG. 2 is a perspective view of the flowmeter of FIG. 1.

In the construction of FIGS. 1 and 2, in both of which the same reference numerals are used, the excitation means for causing the loop 2 to oscillate about the main axis of symmetry S (the primary or excitation axis of rotation) comprise a permanently magnetic magnet yoke 8 fastened to the frame 13 and provided with a permanent magnet 19, said yoke having two air gaps 9 and 10 through which portions 2a and 2b (denoted the second transverse tubes above) of the looped tube 2 are passed, as well as means for introducing an electric current into the tube 2. These are means for generating current in the tube 2 by means of induction in FIGS. 1 and 2. The permanently magnetic magnet yoke 8 has two upper yoke portions 8a and 8a' which are separated from a lower yoke portion 8b by air gaps 9 and 10. The loop 2 extends through a recess 8b' in the yoke portion 8b. A permanent magnet 19 is accommodated between the yoke portions 8a and 8a' with its one (North) pole directed towards the yoke portion 8a and with its other (South) pole directed towards the yoke portion 8a'.

Current is induced in the tube by means of two transformer cores 17, 17a, each provided with a respective coil 18a, 18b, through which cores the respective lateral tube portions 2c and 2d are passed. The coils may be wound on the inner sides of the transformer cores, as shown, or on one of the other sides. The combination of the magnetic fields generated in the gaps 9 and 10 of the permanently magnetic yoke 8, which fields are transverse to the direction of the current and are oppositely directed, and an (alternating) current induced in the tube 2 exerts a torque on the tube owing to which it starts to oscillate or rotate about the axis S (in the so-termed twist mode).

When a medium flows through the tube, the tube will start to oscillate about a response axis S' transverse to the axis S (in the so-termed swing mode) under the influence of Coriolis forces. During operation the (sinusoidal) displacements of points of the tube portion 2e, which are representative of the flow, are detected by means of a Coriolis effect sensor comprising a first sensor 11a located adjacent the tube portion 2e and a second sensor 11b. The first and the second sensor are symmetrically arranged on either side of the excitation axis of rotation S close to the point of intersection thereof with the tube portion 2e. A third sensor 11c may serve for correction purposes. The sensors may be, for example, of an electromagnetic, inductive, capacitive, or ultrasonic type. In the present case, however, optical sensors are chosen. For the optical sensors so-called opto-sensors 11a, 11b, and 11c (FIGS. 1 and 2) are used which each comprise a U-shaped housing that is fastened to the frame 13, with a light source (for example an LED) placed in the one leg of the U and a photosensitive cell (for example a phototransistor) opposite the light source in the other leg. The tube portion 2e is capable of moving between the legs of the U-shaped sensor housings 11a and 11b (and 11c, if present) and block out more or less light from the light source.

FIG. 7 diagrammatically shows a flowmeter of the Coriolis type with a looped sensing tube 70 of the kind shown in FIG. 3. The looped tube 70 has two ends which are connected to an inlet tube 71 for a fluid medium φ and an outlet tube 72, respectively. The inlet and outlet tubes 71, 72 are interconnected, as are the inlet and outlet tubes 3 and 4 of FIG. 3, for example through soldering in locations b or spot welding, and they are fixed in fastening means 74 in a location remote from their connections to the looped tube 70. The fastening means 74 shown here comprise a block having a central recess in which the connection tubes are accommodated. The block has two openings for fastening to a frame by means of bolts. The tube 70 is excited in the swing mode in this case. For this purpose, a permanently magnetic magnet yoke 75 with two air gaps 80 and 81, which are equidistant to the magnet yokes centre line 73, is placed at one of the lateral sides of the looped tube 70 such that the leg 73a of the loop runs through the air gaps 80, 81. The magnet yoke 75 has an upper part with two yoke portions 76, 77 between which a permanent magnet 78 is arranged with a South pole S directed towards the yoke portion 76 and a North pole N directed towards the yoke portion 77. Oppositely directed magnetic fields B and B', which are of equal strength in the ideal case, are generated in the air gaps 80, 81 between the upper portion 76, 77, 78 and the lower portion 79 by this construction. When an alternating electric current I flows through the tube 70, these fields B' and B exert a torque excitation on the tube portion 73a. The tube 70 will perform a swinging movement about an axis of rotation (X) owing to the torque excitation when traversed by an alternating current I. The excitation axis of rotation X in this embodiment is transverse to the inlet and outlet tubes. The yoke 75 is a torque generator.

An alternating current I is induced in the tube 70 in the same manner as in the embodiment of FIGS. 1 and 2. For this purpose, the lateral portions 73a, 73b of the tube 70 are passed through bores in the respective transformer cores 82 and 84 on which respective coils 83 and 85 have been wound at the sides that face one another. The invention, however, is not limited to this. For example, the transformer or coil cores may be provided in alternative locations of the tube 70.

When a fluid φ flows through the tube 70 oscillating about the excitation axis of rotation X, a Coriolis force arises which causes a Coriolis effect. The Coriolis effect is measured with a Coriolis sensor. The Coriolis sensor used in the present embodiment is a system of contactless optical sensors 86a, 86b, 86c identical to the system of contactless opto-sensors 11a, 11b, 11c of the construction in FIGS. 1 and 2, but the invention is not limited thereto.

Two of the optical sensors 86a and 86b are arranged symmetrically with respect to the excitation axis of rotation (the axis of rotation X in this case) also in the construction of FIG. 7. The optical sensors 86a, 86b (and 86c) here cooperate with the lateral portion 73b of the loop 70, which portion is located opposite the portion 73a that cooperates with the magnet yoke providing the torque excitation.

FIGS. 1, 2, 3, and 7 all show a looped rectangular tube with a more or less square circumference. This was found to be a favorable shape as regards the sensitivity, given the correct surface area. If this should be favorable for the placement of the excitation means, the current induction means, and/or the Coriolis effect sensing means, however, it is possible to make the loop, for example, narrower and proportionally higher.

The operation of the integrated magnet yoke 75 will now be explained with reference to FIG. 8. The placement of the permanent magnet 78 between the upper yoke portions 76 and 77 generates oppositely directed magnetic fields B and B' of equal strength in the air gaps. If B in the air gap 80 is directed towards the yoke portion 79 and the current direction is as shown in FIG. 8, then a (Lorentz) force F directed to the front will act on the tube 70. At the same time, the magnetic field B' in the air gap 81 is directed towards the yoke portion 76. This results, in combination with the current I, in a (Lorentz) force F' on the tube 70 directed towards the rear. Accordingly there is a torque excitation. The forces acting on the tube are reversed when the current I through the tube changes direction. The supply of an alternating current to the tube 70 thus leads to a swinging movement of the looped tube 70 about the axis of rotation X.

In brief, the invention relates to a mass flowmeter of the Coriolis type with a tube that forms a closed loop through which a medium flows during operation and which preferably has electromagnetic, contactless excitation means for causing the loop to rotate in an oscillatory mode about an excitation axis of rotation during operation. The loop has a starting point and an end point. The starting and end points are situated close together and are connected to a flexible inlet tube and a flexible outlet tube, respectively, which extend preferably in parallel and close together. The loop is resiliently suspended from the frame of the flowmeter by means of the flexible inlet and outlet tubes, which preferably form one integral piece with the tube of the loop.

The invention claimed is:

1. A mass flowmeter of the Coriolis type, comprising:
   a sensing tube including a mechanically closed loop in a shape of substantially one full turn, said loop having a main symmetry axis and further including a flexible inlet tube and flexible outlet tube; and
   excitation means being provided for causing the loop to rotate in an oscillating mode about the main axis of symmetry of the loop,
   the loop having two closely opposed ends that are connected to first ends of the flexible inlet tube and the flexible outlet tube, the other ends of the inlet tube and outlet tube being connected to a supply/discharge block,
   which inlet and outlet tubes extend in parallel in the plane of and within the loop, symmetrically with respect to the main symmetry axis, between said first ends and fixation means associated with a frame for fastening them,
   and which inlet and outlet tubes are connected to one another between said first ends and the fixation means by soldering or welding,
   whereby the loop is resiliently suspended from the frame by the flexible inlet and outlet tubes, the resulting suspension allowing a movement about two perpendicular axes in the plane of the loop, one for the excitation movement about the main symmetry axis and one for the Coriolis response movement.

2. The mass flowmeter as claimed in claim 1,
   wherein the loop is formed as one integral piece with the inlet tube and the outlet tube.

3. The mass flowmeter as claimed in claim 1,
   wherein the inlet tube and the outlet tube are fastened to the frame at a predetermined distance from the location where they are connected to the ends of the sensing tube, which predetermined distance defines their free path length.

4. The mass flowmeter as claimed in claim 3,
   wherein the inlet tube and the outlet tube extend mutually parallel with their free path lengths, close together or against one another, and are fastened to the frame next to one another.

5. The mass flowmeter as claimed in claim 3,
   wherein the free path length of the inlet and the outlet tube amounts to at least 50% of the height of the loop as viewed in a direction parallel to the inlet and outlet tubes.

6. The mass flowmeter as claimed in claim 1, wherein the loop forms a rectangle with two parallel lateral tubes, a first transverse tube connected to first ends of the lateral tubes, and two second transverse tubes connected at their one ends to the second ends of the lateral tubes and at their other ends to the inlet tube and the outlet tube, respectively.

7. The mass flowmeter as claimed in claim 6,
wherein the inlet tube and the outlet tube extend in the plane of the ioop and within the loop, closely next to one another or against one another, on either side of an axis of symmetry of the loop, and are fastened to the frame in a location closer to the first transverse tube than to the second transverse tube.

8. The mass flowmeter as claimed in claim 6,
wherein the inlet and the outlet tube have a free path length of at least 50% of the length of each of the lateral tubes.

9. The mass flowmeter as claimed in claim 6,
wherein the second transverse tubes are mechanically interconnected adjacent their connections to the inlet and the outlet tube.

10. The mass flowmeter as claimed in claim 1,
wherein the excitation means excite the loop in a twist excitation mode.

11. The mass flowmeter as claimed in claim 1,
wherein two sensors for measuring displacements of two points of a tube portion as a function of time are arranged adjacent this tube portion on either side of the excitation rotation axis.

12. The mass flowmeter as claimed in claim 11,
wherein the magnet yoke has a central opening between the air gaps, and in that the sensors are arranged in said opening.

13. The mass flowmeter as claimed in claim 11,
wherein the tube forms a rectangular loop, the magnet yoke is arranged at one side of the rectangular loop, and the sensors are arranged at the side opposite thereto.

14. The mass flowmeter as claimed in claim 11,
wherein two sensors for measuring displacements of two points of a tube portion as a function of time are arranged adjacent this tube portion on either side of the excitation rotation axis.

15. A mass flowmeter of the Coriolis type, comprising:
a sensing tube that forms a single loop through which a medium flows during operation, and with excitation means for causing said loop to vibrate about an excitation axis of rotation during operation, said axis lying in the plane of said loop,
wherein the loop follows a mechanically closed path, in that the sensing tube has two mutually opposed ends that are connected to first ends of a flexible inlet tube and a flexible outlet tube, the other ends of which are connected to a supply/discharge block for the flowing medium, and in that the loop is resiliently suspended from a frame by means of said flexible inlet and outlet tubes such that the resulting suspension allows a movement about two mutually perpendicular axes in the plane of the loop, one for the excitation movement and one for the Coriolis movement that arises when a medium is flowing through the tube,
and the excitation means comprise means adapted to generate an electric current in the wall of the tube and magnet means that generate a magnetic field transverse to the direction of the current in the wall of the tube so as to exert Lorentz forces on the tube through interaction with the current through the tube.

16. The mass flowmeter as claimed in claim 15,
wherein the magnet means comprise a permanently magnetic magnet yoke with an air gap through which a tube portion extends.

17. The mass flowmeter as claimed in claim 15,
wherein the magnet means comprise a permanently magnetic magnet yoke with two air gaps through which respective tube portions extend, oppositely directed magnetic fields obtaining in said air gaps.

18. A mass flowmeter of the Coriolis type, comprising:
a mechanically closed tubular sensing loop having a rectangular shape, said loop having a main symmetry axis,
wherein the loop forms a rectangle with two parallel lateral tubes, a first transverse tube connected to first ends of the lateral tubes, and two second transverse tubes connected at their one ends to the second ends of the lateral tubes and at their other ends to a flexible inlet tube and a flexible outlet tube, respectively,
which flexible inlet and outlet tubes extend in parallel symmetrically with respect to the main symmetry axis and suspend the loop relative to a frame,
excitation means being arranged for causing the loop to rotate in an oscillating mode about the main axis of symmetry of the loop,
a pair of first and a second sensors being arranged on either side of the main axis of symmetry for detecting displacements of points of the first transverse tube, said pair of first and second sensors being combined with a third sensor for correction purposes.

19. The mass flowmeter of the Coriolis type as claimed in claim 18, wherein the first, second and third sensors are optical sensors, and each sensor comprises a U-shaped housing with two legs that is fastened to the frame, with a light source placed in the one leg and a photosensitive cell in the other leg, the first transverse tube being capable of moving between the legs of the U-shaped sensor housings.

* * * * *